US007275683B2

(12) United States Patent
Lazarowicz et al.

(10) Patent No.: US 7,275,683 B2
(45) Date of Patent: Oct. 2, 2007

(54) STORED-VALUE CARD ASSEMBLY WITH PACKAGE

(75) Inventors: Karie Lazarowicz, Minneapolis, MN (US); Bethany Mueller, Arden Hills, MN (US); Jodi Eckes, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 201 days.

(21) Appl. No.: 11/108,356

(22) Filed: Apr. 18, 2005

(65) Prior Publication Data

US 2006/0231609 A1 Oct. 19, 2006

(51) Int. Cl.
*G06F 17/00* (2006.01)

(52) U.S. Cl. ............ 235/375; 235/380; 235/487; 705/39

(58) Field of Classification Search ......... 235/375, 235/380, 486, 487, 381, 492; 705/39
See application file for complete search history.

(56) References Cited

U.S. PATENT DOCUMENTS

| 273,023 | A | 2/1883 | Butler et al. |
|---|---|---|---|
| 4,054,242 | A | 10/1977 | Strobe |
| 4,418,497 | A | 12/1983 | Mastriano |
| 5,158,809 | A | 10/1992 | Proctor |
| 5,303,487 | A | 4/1994 | Olson |
| 5,575,384 | A | 11/1996 | Saye |
| 5,840,355 | A | 11/1998 | Prescott et al. |
| 6,349,829 | B1 | 2/2002 | Matheis et al. |
| 6,449,891 | B1 | 9/2002 | Miska |
| 6,659,271 | B2 | 12/2003 | Parsons |
| 6,684,561 | B2 | 2/2004 | Poret et al. |
| 6,732,459 | B1 | 5/2004 | Clark |
| 7,004,398 | B1* | 2/2006 | Francis et al. ............ 235/486 |
| 7,055,740 | B1* | 6/2006 | Schultz et al. ............ 235/381 |
| 2004/0020085 | A1 | 2/2004 | Ferguson et al. |
| 2004/0118044 | A1 | 6/2004 | Weder |
| 2006/0048422 | A1 | 3/2006 | Dyvig et al. |
| 2006/0157554 | A1* | 7/2006 | Halbur et al. ............ 235/380 |
| 2006/0157555 | A1* | 7/2006 | Dean et al. ............... 235/380 |

OTHER PUBLICATIONS

Lauer, Amy et al., "Personalized Financial Transaction Cards and Methods," U.S. Appl. No. 10/804,796, filed Mar. 18, 2004, (20 pages).

* cited by examiner

*Primary Examiner*—Thien M. Le
*Assistant Examiner*—Edwyn Labaze
(74) *Attorney, Agent, or Firm*—Ingrassia Fisher & Lorenz, P.C.

(57) ABSTRACT

A stored-value card assembly includes a stored-value card, a package, and a backer. The stored-value card includes an account identifier adapted to link the stored-value card to a financial account or a financial record. The package includes a container and at least one good enclosed within the container. The backer is coupled with each of the stored-value card and the package. Other stored-value card assemblies and associated methods are also disclosed.

21 Claims, 9 Drawing Sheets

STORED-VALUE CARD ASSEMBLY WITH PACKAGE

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card assembly including a stored-value card, a package, and a backer. The stored-value card includes an account identifier adapted to link the stored-value card to a financial account or a financial record. The package includes a container and at least one good enclosed within the container. The backer is coupled with each of the stored-value card and the package. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card, financial transaction card, or other stored-value card is adapted for making purchases of goods and/or services from e.g. a retail store or website. According to one embodiment, an original consumer buys a stored-value card to give a recipient who in turn is able to use the stored-value card at the retail store or other setting to pay for the goods and/or services. A stored-value card assembly, according to embodiments of the present invention, provides the consumer or recipient with a stored-value card as well as a package, such as a package of seeds. In one embodiment, the inclusion of the package in the stored-value card assembly promotes the sale and/or loading of the stored-value card by potential consumers and/or bearers of the stored-value card.

Figure 1:
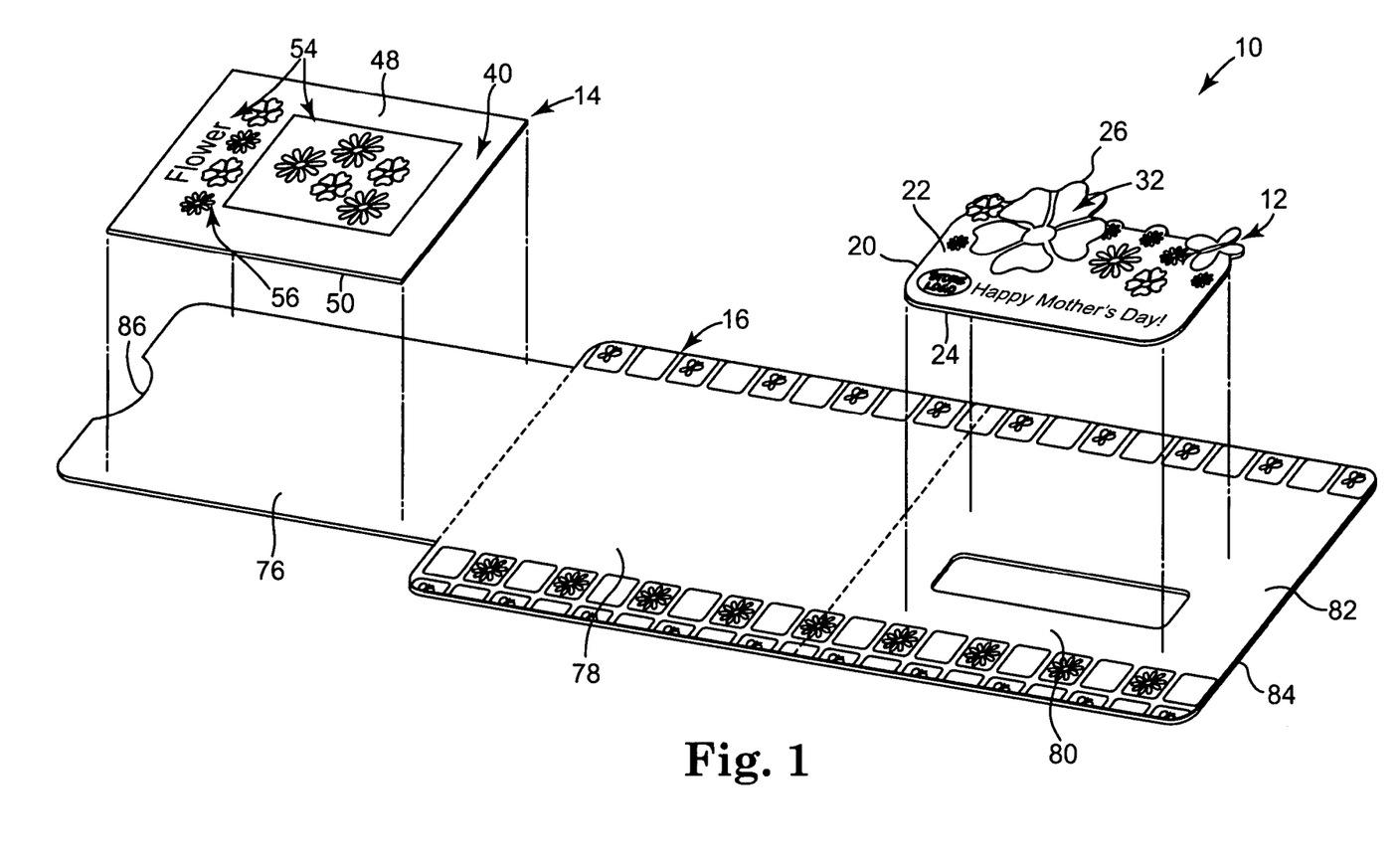
FIG. 1 is an exploded, top perspective view of one embodiment of a stored-value card assembly, according to the present invention.

Turning to the figures, FIG. 1 is an exploded, top perspective view of one embodiment of a stored-value card assembly 10 according to the present invention. Stored-value card assembly 10 includes a stored-value card 12, a package 14, and a backer or carrier 16. In one embodiment, stored-value card 12 and package 14 are each individually coupled with backer 16 to collectively provide stored-value card assembly 10 for purchase and/or presentation to a recipient.

Figure 2A:
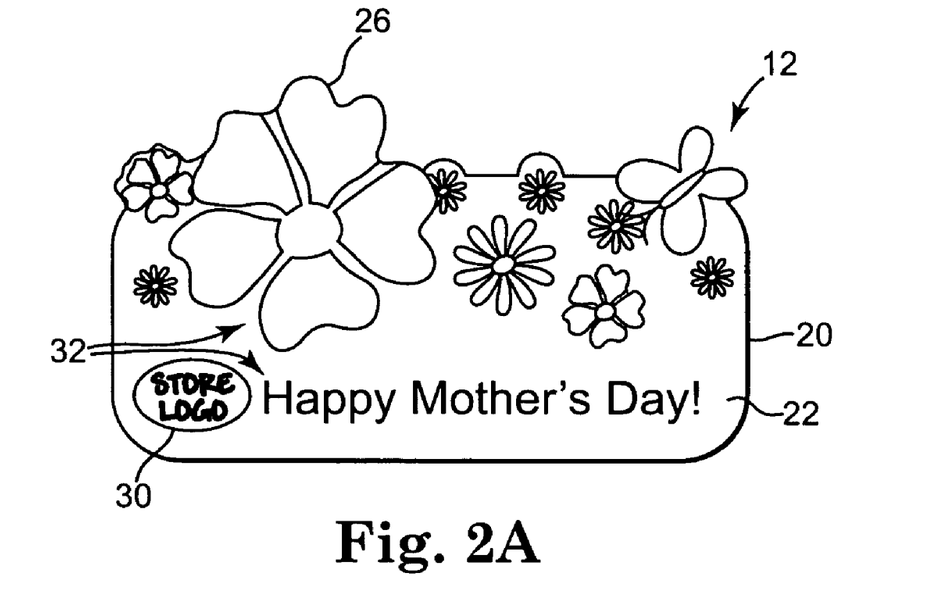
FIG. 2A is a top view of one embodiment of a stored-value card of a stored-value card assembly, according to the present invention.
Figure 2B:
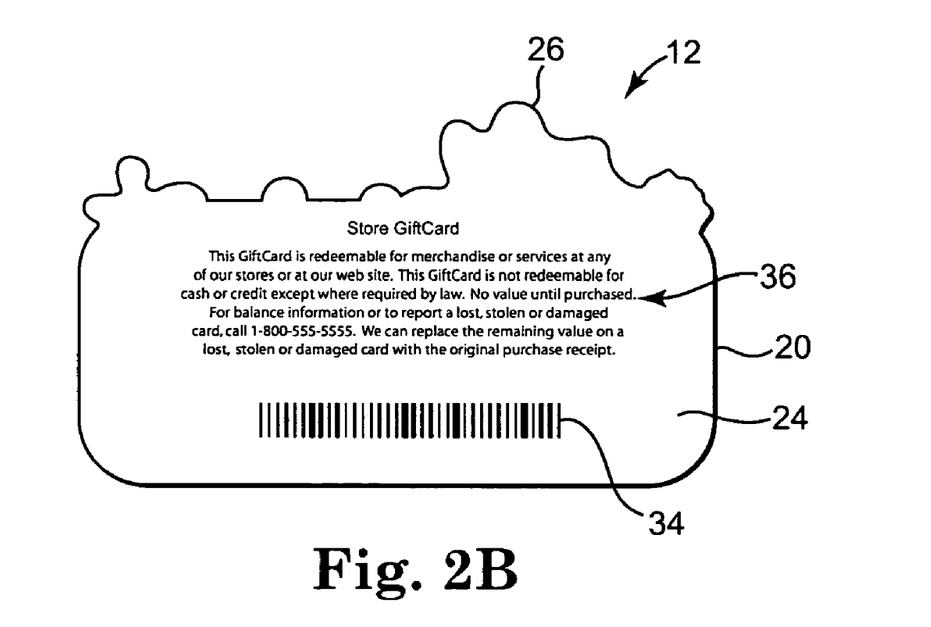
FIG. 2B is a bottom view of the stored-value card of FIG. 2A.

One embodiment of stored-value card 12 is illustrated with additional reference to FIGS. 2A and 2B. Stored-value card 12 includes a substantially planar panel 20 defining a first planar surface 22 and a second substantially planar surface 24 opposite first surface 22. In one embodiment, panel 20 is substantially rectangular in shape and is of a size similar to that of an identification card, a credit card, or other credit card sized to fit in a wallet of a card bearer. In particular, in one embodiment, stored-value card 12 is about 8.5 cm long, about 5.5 cm wide, and less than about 1 mm thick. In other embodiments, panel 20 is otherwise shaped as a square, circle, oval, star, or any other suitable shape. For example, as illustrated in FIGS. 2A and 2B, panel 20 is substantially shaped similarly to a card configured to be carried in a wallet but includes at least one edge 26 having a plurality of cut outs or a non-linear edge configured to enhance the aesthetic appeal of stored-value card 12. Panel 20 is formed of a somewhat rigid yet flexible material similar to that commonly used for identification cards, credit cards, etc. In one embodiment, panel 20 is formed of a paper, cardstock, plastic, e.g. polycarbonate or polyvinyl chloride (PVC), etc. In one embodiment, panel 20 is formed of injection molded plastic or cut from sheet-stock plastic material.

First surface 22 includes brand indicia 30 and/or decorative indicia 32. In one embodiment, brand indicia 30 identify a brand, e.g. a product brand, a store brand, etc., associated with stored-value card assembly 10. In one embodiment, decorative indicia 32 include a background design, seasonal or holiday identifier, occasion identifier, such as a media format identifier (e.g. characters, logos, scenes, or other illustrations relating to at least one of a movie, television show, book, etc.), and/or other suitable text, objects, or designs. For example, as illustrated in FIG. 2A, decorative indicia 32 include a plurality of flowers creating a spring-like appearance and a "Happy Mother's Day" message. Moreover, decorative indicia 32 may be coordinated with cut-out edge 26 to further enhance the aesthetics of stored-value card 12. In one embodiment, decorative indicia 32 coordinate with other products or displays in the retail setting offering stored-value card assembly 10 and, therefore, are part of a larger holiday, occasional, or promotional campaign throughout a store or department. In one embodiment, indicia 30 and/or 32 are printed or otherwise disposed upon first surface 22.

Second surface 24 of stored-value card 12 includes an account identifier 34, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 34 is printed or otherwise disposed on second surface 24 of stored-value card 12. Account identifier 34 indicates a financial account or record to which stored-value card 12 is linked. The account or record maintains the monetary balance on stored-value card 12 and is optionally stored on a database, other electronic or manual record-keeping system, or, in the case of "smart" cards, for example, on a chip or other electronic device on stored-value card 12 itself. Accordingly, by scanning account identifier 34, a financial account or record linked to stored-value card 12 is identified and can subsequently be activated, have amounts debited therefrom, and/or have amounts added thereto. With the above in mind, account identifier 34 is one example of means for linking stored-value card 12 with a financial account or record and is one example of means for activating or loading value on stored-value card 12.

In one embodiment, redemption indicia 36 are included on second surface 24. Redemption indicia 36 indicate that stored-value card 12 is redeemable for the purchase of goods and/or services and that, upon use, a value of the purchased goods and/or services will be deducted from the financial account or record linked to stored-value card 12. In one embodiment, redemption indicia 36 include phrases such as "<NAME OF STORE>GiftCard" and "This GiftCard is redeemable for merchandise or services at any of our stores or at our website," and/or provides help or phone line information in the case of a lost, stolen, or damaged stored-value card, etc. In one embodiment, other indicia are printed or otherwise disposed on second surface 24 including other objects, text, backgrounds, graphics, brand identifiers, etc.

Figure 3:
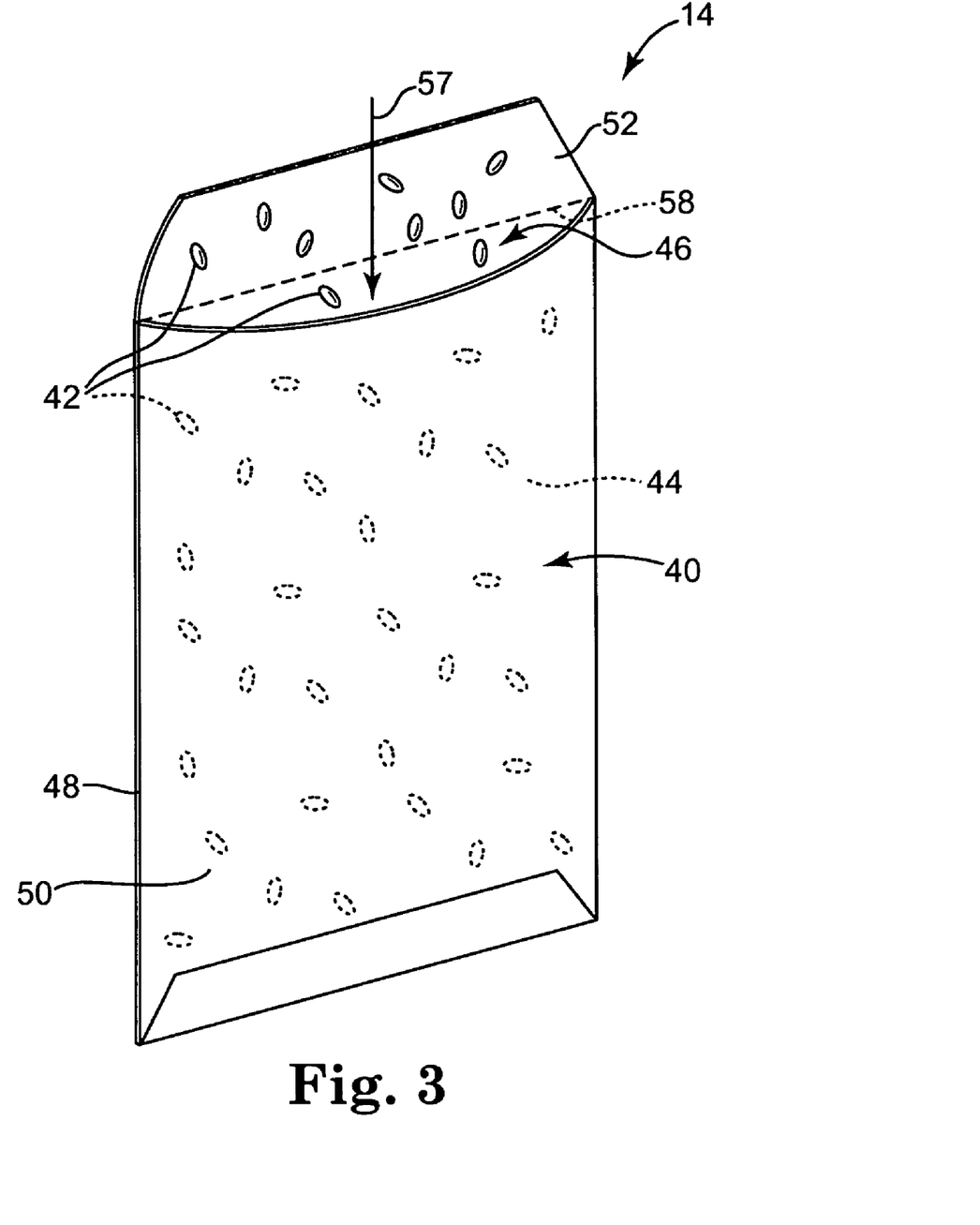
FIG. 3 is a perspective view of one embodiment of a package of a stored-value card assembly of FIG. 1.

FIG. 3 illustrates one embodiment of package 14. Package 14 generally includes a package or container 40 and at least one item 42. Container 40 is configured to enclose the at least one item 42. According to specific examples, container 40 is an envelope, a bag, a box or any other suitable container 40 defining a compartment or chamber 44 for receiving the item(s) 42. The at least one item 42 is one or a plurality of goods (e.g., one or a plurality of loose items 42 as illustrated in FIG. 3) stored within chamber 44 of container 40. In one embodiment, the at least one item 42 is any item selected to be of interest to the consumer or recipient, such as seeds, toys, games, puzzles, puzzle pieces, collector items, or any other suitable items desirable by the consumer or recipient.

In one example, container 40 is an envelope folded to define chamber 44 as well as an opening 46 at one end of chamber 44. In one embodiment, a flap 52 configured to be folded to close opening 46. With this in mind, as illustrated with additional reference to FIG. 1, container 40 defines a front surface 48 and a back surface 50, wherein chamber 44 is formed between surfaces 48 and 50 and wherein flap 52 defines a portion of front surface 48. In one embodiment, in which container 40 is an envelope and the at least one item 42 is a plurality of seeds for planting, package 14 is a seed packet.

Continuing to refer to the embodiments illustrated in FIG. 1 and FIG. 3, front surface 48 includes informative indicia 54 and/or decorative indicia 56. Informative indicia 54 describe or otherwise indicate what type of item 42 is maintained in chamber 44. Informative indicia 54 may include a picture, sketch, or other illustration of item(s) 42 and/or a text name or description of the item(s) 42. For example, where the at least one item 42 is a plurality of flower or other plant seeds, informative indicia 54 include a picture of a matured flower corresponding to the plurality of flower seeds and/or the name of the particular flower to be grown from the plurality of flower seeds.

Decorative indicia 56 include a background design, seasonal or holiday identifier, occasion identifier, media format identifier, and/or other suitable indicia. In one example, decorative indicia 56 are similar to or otherwise correspond with decorative indicia 32 of stored-value card 12. Therefore, in one embodiment, decorative indicia 56 correspond to an overall holiday, occasional, or promotional campaign presented throughout a portion of the retail store offering stored-value card assembly 10. Indicia 54 and 56 are generally printed or otherwise disposed on first surface 48. Indicia other than indicia 54 and 56 may also be included on first surface 48. In one embodiment, similar or other indicia are included on second surface 50 of container 40.

The at least one item 42 is placed through opening 46 into chamber 44 as indicated by arrow 57. Upon placement of the entirety of the at least one item 42 within chamber 44, flap 52 is folded about a fold line 58, over opening 46 and sealed to back surface 50 to thereby close chamber 44 and prevent or decrease any of the at least one item(s) 42 from escaping chamber 44. Package 40 provides one example of means for maintaining and/or enclosing at least one item.

Figure 4A:
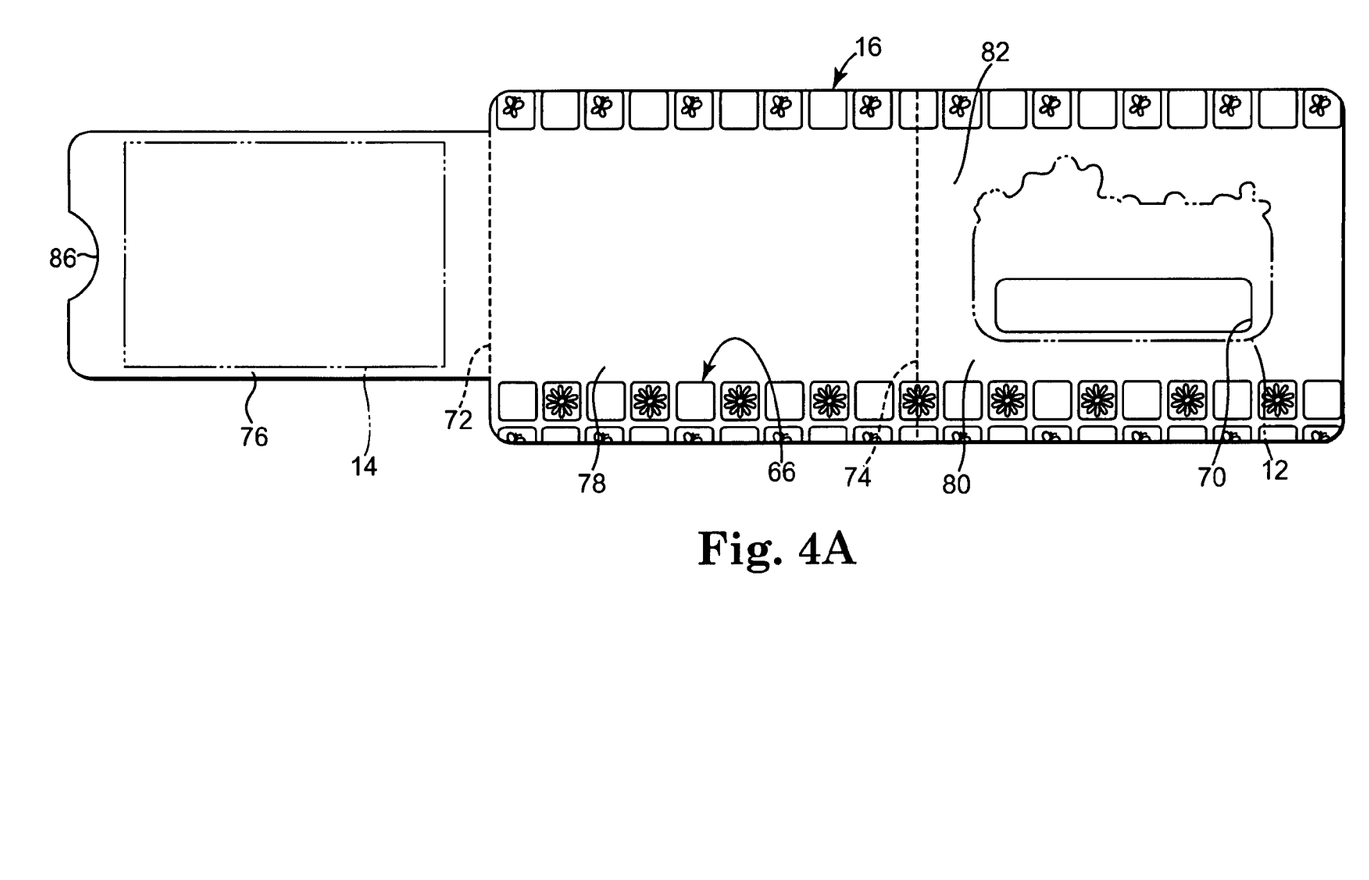
FIG. 4A is a front view of one embodiment of an unfolded backer for a stored-value card assembly, according to the present invention.
Figure 4B:
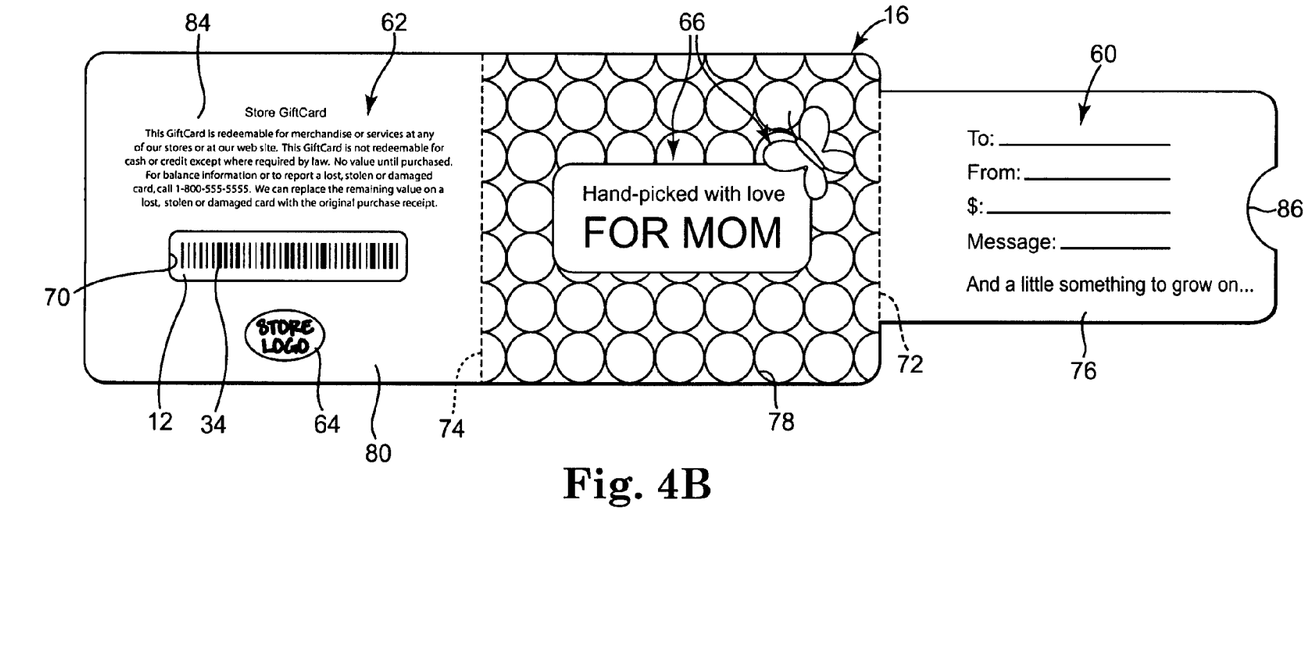
FIG. 4B is a back view of the unfolded backer of FIG. 4A.

FIGS. 4A and 4B illustrate a backer or carrier 16 for supporting stored-value card 12 and package 14 in an open or unfolded configuration. Backer 16 comprises a single layer or multiple layers of paper or plastic material, for example, generally in the form of relatively stiff but bendable/flexible card. In one embodiment, backer 16 is formed of a material sufficiently rigid to support stored-value card 12 and package 14. For example, backer 16 is formed of 12-point or thicker cardstock. Use of other materials is also contemplated. Backer 16 displays indicia, graphics, or text information including store logo(s), store name(s), slogans, advertising, instructions, directions, brand indicia, promotional information, holiday indicia, seasonal indicia, media format identifiers, characters, and/or other information.

Indicia 60, for example, include to, from, initial gift card value, and message fields. Indicia 62 indicate that the stored-value card 12 is redeemable for the purchase of goods and/or services and that, upon use, a value of the purchased goods and/or services will be deducted form the financial account or record linked to stored-value card 12. In one embodiment, indicia 62 include phrases such as "<NAME OF STORE>GiftCard" and "This GiftCard is redeemable for merchandise or services at any of our stores or at our website," and/or provides help or phone line information in case of a lost, stolen, or damaged stored-value card 12, etc. Indicia 64 identify a store, brand, department, etc. and/or services associated with stored-value card 12.

Decorative indicia 66 are configured to increase the overall aesthetic appeal of backer 16 and include one or more of text, graphics, patterns, borders, backgrounds, etc. For example, decorative indicia 66 may indicate the occasion, holiday, or other event with which stored-value card assembly 10 is associated. In one embodiment, decorative indicia 66 correspond with one or more of decorative indicia 32 of stored-value card 12, decorative indicia 56 of package container 40, and decorative displays throughout the associated retail setting or an area thereof. As such, decorative indicia 32 or decorative indicia 56 in view of decorative indicia 66 provide examples of means for visually linking backer 16 with package container 40 or stored-value card 12, respectively. In one embodiment, decorative indicia 66 describe or allude to what type of at least one item 42 is enclosed within container 40.

For example, decorative indicia 66 may include the phrase "Hand-picked with love for Mom" to indicate that stored-value card assembly 10 is associated with Mother's Day and to allude to the fact that flower or other plant seeds, which can be "picked" upon maturity, are included within stored-value card assembly 10. Any of indicia 60, 62, 64, 66, or other indicia, optionally may appear anywhere on backer 16 or stored-value card assembly 10. Additional information besides that specifically described and illustrated herein may also be included.

Stored-value card 12 is readily releasably attached to backer 16, for example with adhesive or the like, and is represented in phantom lines in FIG. 4A. Backer 16 defines a window or opening 70 for displaying account identifier 34 of stored-value card 12 as illustrated in FIG. 4B. As previously described, account identifier 34 is adapted for accessing a financial account or record associated with stored-value card 12 for activating, loading, or debiting from the financial account or record. Accordingly, window 70 allows access to account identifier 34 to activate and/or load stored-value card 12 generally without removing stored-value card 12 from backer 16.

In one embodiment, backer 16 defines at least one fold line 72 and at least one fold line 74 spaced from the at least one fold line 72, which collectively divide backer 16 into three panels. More particularly, fold lines 72 and 74 divide backer 16 into a first panel 76, a second panel 78, and a third panel 80. In one example, first panel 76 is configured to support package 14, second panel 78 extends between first panel 76 and third panel 80, and third panel 80 includes window 70 and is configured to receive stored-value card 12. More specifically, panels 76, 78, and 80 collectively define an inside surface 82 (illustrated in FIG. 4A) and an outside surface 84 (illustrated in FIG. 4B) opposite inside surface 82. Stored-value card 12 and package 14 are coupled on inside surface 82 of backer 16.

In one embodiment, stored-value card 12 and/or package 14 are selectively secured to backer 16 with a releasable adhesive, or other means permitting or facilitating removal of package 14 from backer 16. Backer 16 provides on example of means for supporting stored-value card 12 and package 40 of package 14.

In one embodiment, second panel 78 and third panel 80 are similarly sized and shaped, and first panel 76 is sized slightly smaller (for example, slightly narrower than second panel 78 and third panel 80). In this respect, upon folding of first panel 76 about fold line 72 to interface with second panel 78, a portion of second panel 78 is visible around first panel 76 as illustrated in the partially folded view of FIG. 5. In one example, indicia, such as decorative indicia 66 on second panel 78, are visible around first panel 76 when backer 16 is partially folded. As illustrated, while backer 16 is in the partially folded position, package 14 may be hidden from consumer or recipient view while indicia 60 and stored-value card 12 are visible inside backer 16. In one embodiment, first panel 76 defines a notch 86 opposite second panel 78 to facilitate unfolding first panel 76 by moving first panel 76 away from second panel 78.

Figure 5:
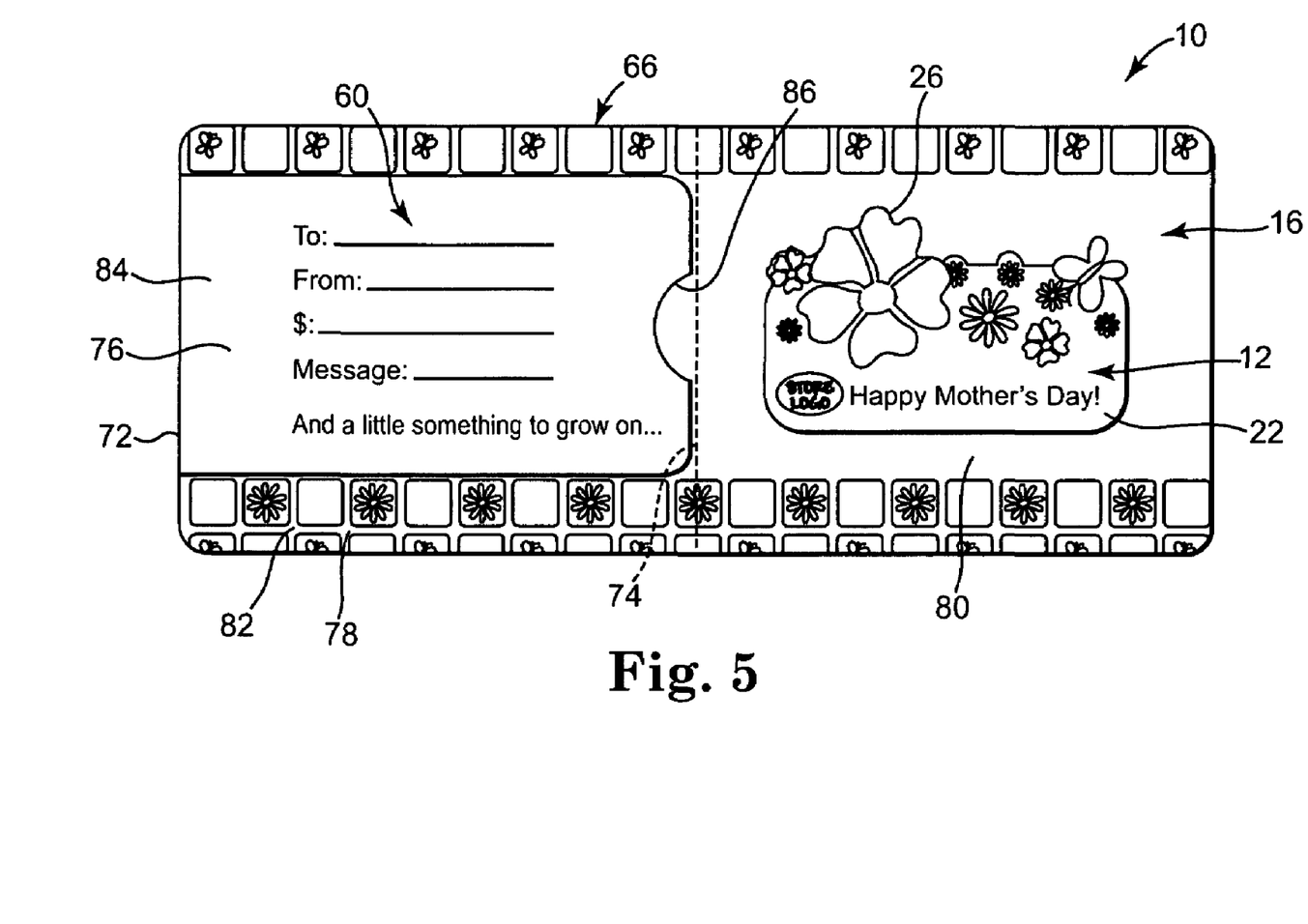
FIG. 5 is a front view of one embodiment of a stored-value card assembly with a partially folded backer.

In one embodiment, backer 16 is further folded back about fold line 74 such that outside surface 84 of second panel 78 interfaces with outside surface 84 of third panel 80. In this respect, stored-value card assembly 10 is configured to be supported on a rack or other fixture such that inside surface 82 of third panel 80 and, thereby, stored-value card 12 face potential consumers in a retail store. In other examples, stored-value card 12 and/or package 14 are coupled to other panels 76, 78, or 80 of backer 16 different from those specifically described above. Use of a backer other than backer 16 having more or less than three panels is also contemplated.

After purchase, backer 16 is foldable about fold line 74 such that the surfaces illustrated in FIG. 5 (i.e. outside surface 84 of first panel 76 and inside surface 82 of third panel 80) are folded toward each other and stored-value card assembly 10 is enclosed in a compact package formed by folded backer 16. In this manner, outside surfaces 84 of second panel 78 and third panel 80 of backer 16 are disposed toward the outside of the folded, compact package, according to embodiments of the invention. Folded backer 16 effectively wraps stored-value card assembly 10 for presentation by a consumer to a recipient. In one embodiment, when backer 16 is folded, first panel 76, stored-value card 12, and package 14 are each substantially hidden from view. As such, folded backer 16 provides one example of means for substantially enclosing stored-value card 12 and package 40.

In one embodiment, each of the at least one fold line 72 and 74 comprises two fold lines slightly spaced from one another to accommodate a thickness of stored-value card 12 and/or a thickness of package 14. In other embodiments, each fold line 72 and 74 is a single fold line. Moreover, in one embodiment, backer 16 is folded about or in various directions about fold line 72 and 74 in any available configuration for display of stored-value card assembly 10 or for presentation of stored-value card 12 to a potential consumer.

Figure 6:
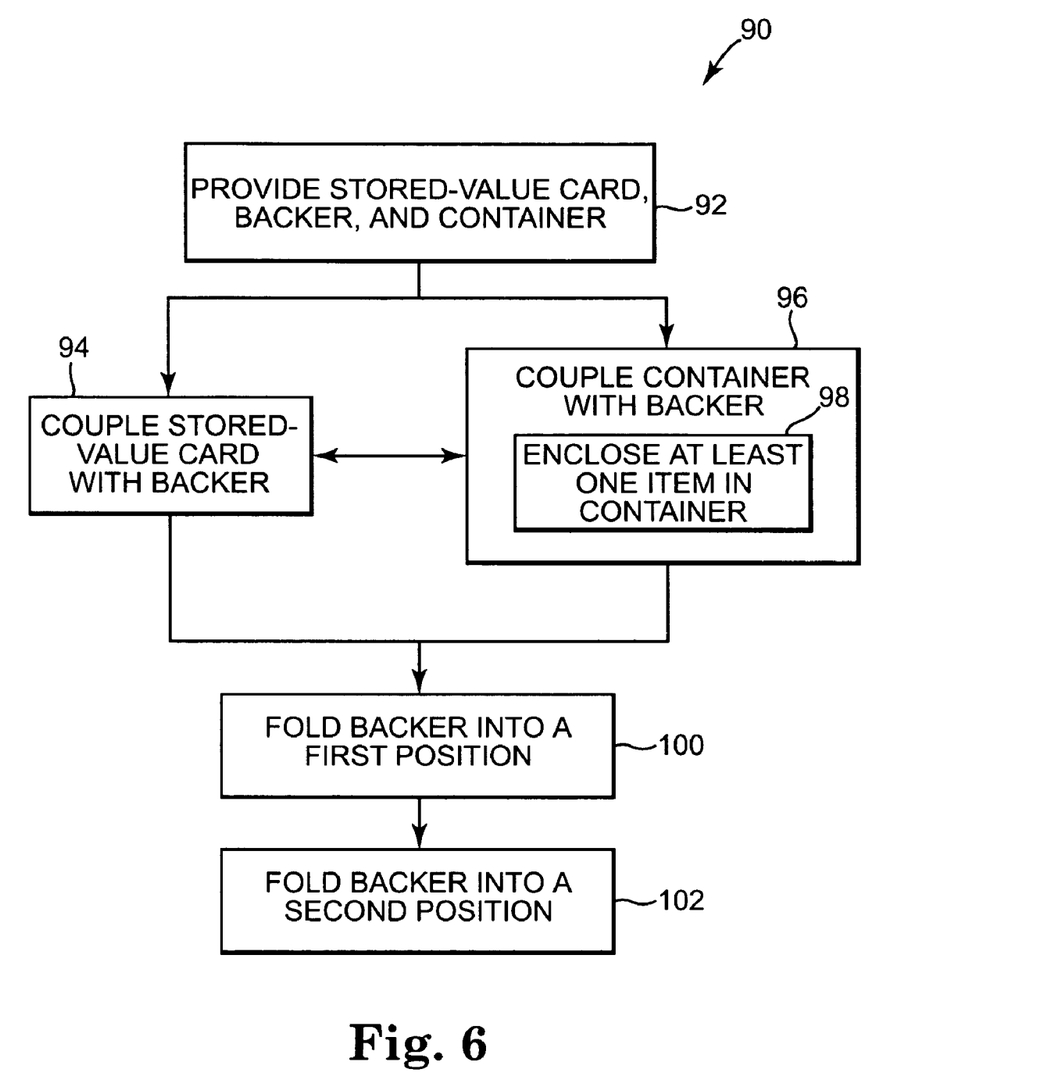
FIG. 6 is a flow chart illustrating one embodiment of a method of assembling a stored-value card assembly, according to the present invention.

FIG. 6 is a flow chart illustrating one embodiment of a method 90 of assembling stored-value card assembly 10. Referring to FIG. 6 in view of FIG. 1, at 92, stored-value card 12, backer 16, and container 40 are provided including various indicia as described above. In one embodiment, one or more of stored-value card 12, backer 16, and container 40 include indicia, such as indicia 32, 56, and 66, respectively, configured to coordinate with the indicia of at least one other of stored-value card 12, backer 16, and container 40.

At 94, stored-value card 12 is coupled with backer 16. More specifically, in one embodiment, stored-value card 12 is coupled with third panel 80 of backer in a manner aligning account identifier 34 of stored-value card 12 with window 70 of backer 16. In one example, stored-value card 12 is coupled with third panel with an adhesive or selectively releasable material or device. At 96, container 40 is coupled with backer 16, for example, with first panel 76 of backer 16. In one embodiment, coupling container 40 with backer 16 includes, at 98, enclosing at least one item 42 (illustrated in FIG. 3) within container 40 to form package 14. In other examples, items 42 are enclosed within container 40 prior to coupling container 40 to backer 16. Container 40 is coupled with backer 16 with an adhesive or the like.

Following coupling of stored-value card 12 and container 40 with backer 16, at 100, backer 16 is folded into a first position similar to that illustrated with reference to FIG. 5. Backer 16 is, more specifically, folded into first position by folding first panel 76 about fold line(s) 72 to interface the portion of inside surface 82 formed by first panel 76 with the portion of inside surface 82 formed by second panel 78. In one example, package 14 is at least partially shielded from view when backer 16 is folded into the first position. In one embodiment, stored-value card 12 is visible when backer 16 is in the first position.

At 102, backer 16 is folded in a second position to prepare stored-value card assembly 10 for display in or shipping to a retail store or similar setting. In one embodiment, backer 16 is folded into the second position by rotating third panel 80 about fold line(s) 74 to interface the portion of outside surface 84 formed by third panel 80 with the portion of outside surface 84 formed by second panel 78. In this manner, the portion of inside surface 82 formed by second panel 78 and stored-value card 12 are visible from one side of folded backer 16. As such, backer 16 is positioned to be placed in a rack or other display such that stored-value card 12 is visible to potential consumers. In other embodiments, backer 16 is folded about fold line(s) 74 in the opposite direction as described above, such that stored-value card 12 is not generally visible when backer 16 is folded into the second position. In one example, stored-value card assembly 10 folded in the second position is packed for shipping to a retail store or similar setting for retail sale.

Figure 7:
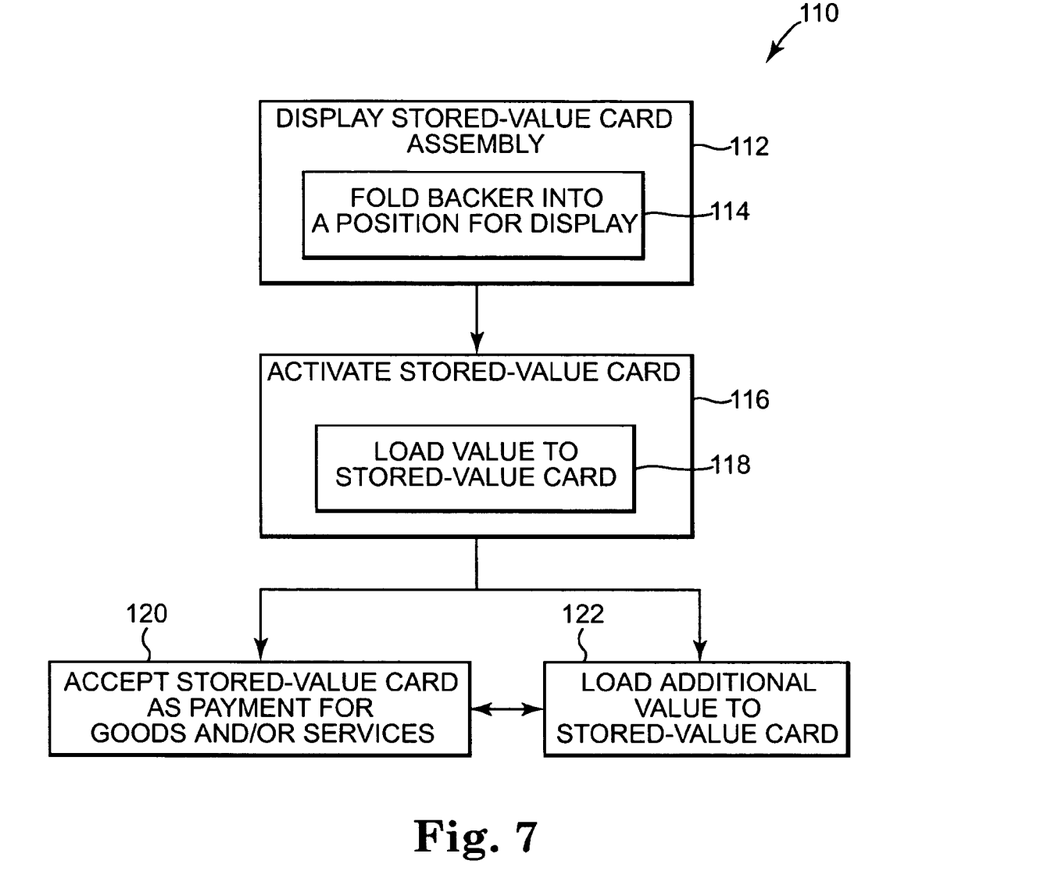
FIG. 7 is a flow chart illustrating one embodiment of a method of providing a stored-value card assembly, according to the present invention.

FIG. 7 is a flow chart illustrating one embodiment of a method 110 of providing stored-value card assembly 10 for sale to and use by consumers. At 112, stored-value card assembly 10 is placed or hung from a rack, shelf, or similar device to display stored-value card assembly 10 for sale to potential consumers. In one example, stored-value card assembly 10 is placed for sale such that stored-value card 12 is visible to the potential consumers (e.g., with backer 16 folded into the second position). If the backer 16 is not previously folded as desired for display, at 114, backer 16 is folded into the desired display position and placed on the rack, shelf, or other device. In one embodiment, a depiction of stored-value card assembly 10 is placed on a website for viewing and purchase by potential consumers.

At 116, a consumer, who has decided to purchase stored-value card assembly 10, presents the stored-value card assembly 10 to a retail store employee, retail store kiosk, or other person or device to scan account identifier 34 of stored-value card 12 through window 70 of backer 16 to access the financial account or record linked to account identifier 34. Upon accessing the financial account or record, the account or record is accessed and a predetermined or consumer-customized value is added to the financial account or record. Thus, stored-value card 12 is activated and loaded. Once stored-value card 12 is activated and loaded, stored-value card 12 can be used by the consumer or any other bearer of stored-value card 12 to purchase goods and/or services at the retail store or other affiliated retail setting or website.

At 120, the retail store or other affiliated retail setting or website accepts stored-value card 12 as payment towards the purchase of goods and/or services by the current bearer of stored-value card 12. In particular, the value currently loaded on stored-value card 12 is applied towards the purchase of goods and/or services. At 122, additional value is optionally loaded on stored-value card 12 at a point-of-sale terminal, kiosk, or other area of the retail store or related setting. Upon accepting stored-value card 12 as payment at 120, the retail store or related setting can subsequently perform either step 120 again or step 122 as requested by a current bearer of stored-value card 12. Similarly, upon loading additional value to stored-value card 12 at 122, the retail store or related setting can subsequently perform either step 122 again or step 120. In one example, the ability to accept stored-value card 12 as payment for goods and/or services is limited by whether the financial account or record associated with stored-value card 12 has any value at the time of attempted redemption.

Figure 8:
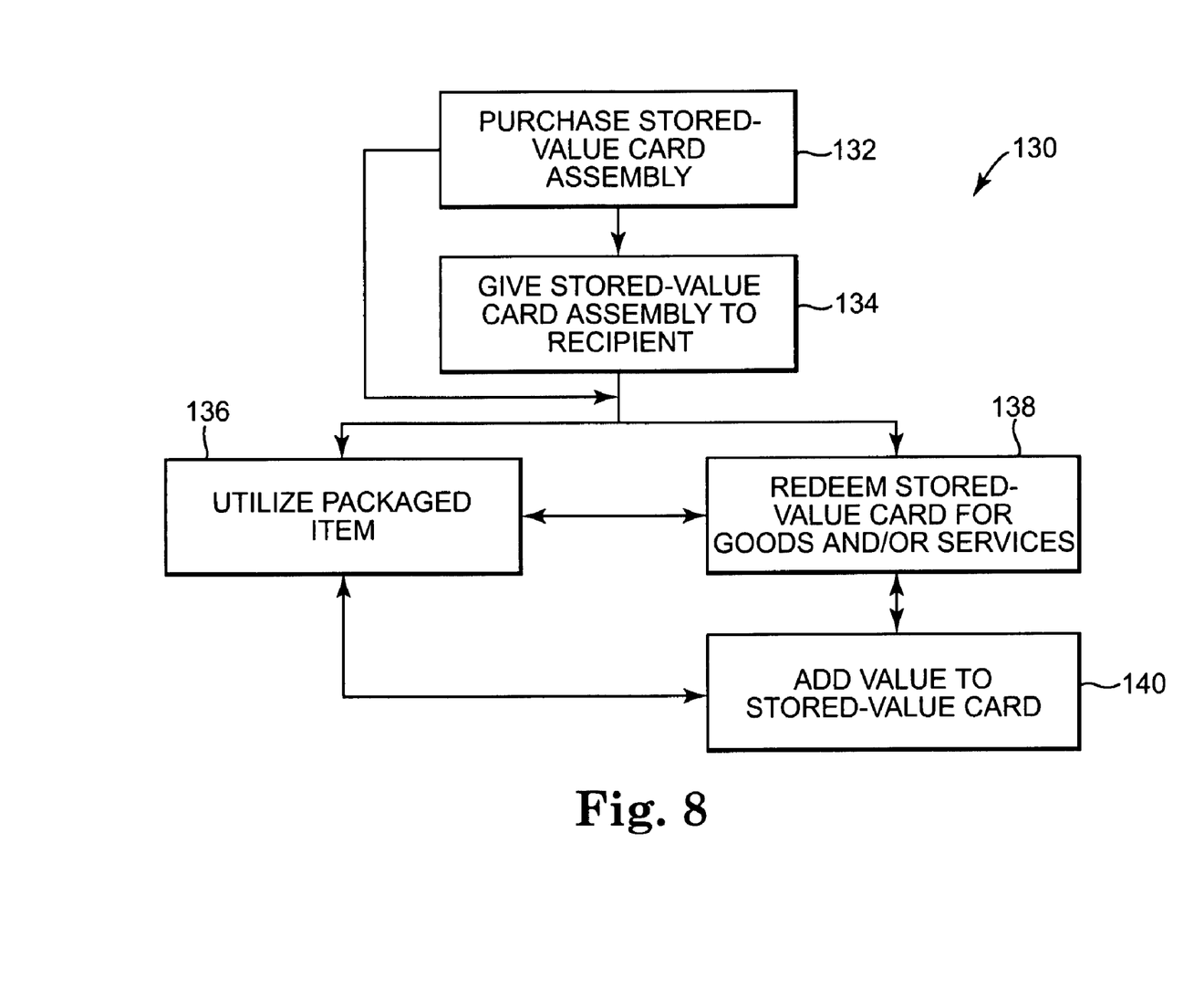
FIG. 8 is a flow chart illustrating one embodiment of a method of using a stored-value card assembly, according to the present invention.

FIG. 8 is a flow chart illustrating one embodiment of a method 130 of using stored-value card assembly 10. At 132, a potential consumer of stored-value card assembly 10, which is displayed in a retail store or viewed on a website, decides to and does purchase stored-value card assembly 10 from the retail store or website setting. Upon purchasing of stored-value card assembly 10, a retail store employee, retail store kiosk, or other person or device scans account identifier 34 through window 70 of backer 16 to access the financial account or record linked to account identifier 34 and to thereby activate or load value onto stored-value card 12. At 134, the consumer optionally gives stored-value card assembly 10 to a recipient, such as a graduate, relative, friend, expectant parents, one having a recent or impending birthday, a couple having a recent or impending anniversary, etc. As an alternative, the consumer can keep stored-value card assembly 10 for his or her own use.

At 136, the consumer or recipient, whoever is in current ownership or otherwise is the current bearer of stored-value card assembly 10, removes package 14 from stored-value card assembly 10. In particular, the bearer of stored-value card assembly 10 removes package item 14 from backer 16. Once package 14 is removed from stored-value card assembly 10, the bearer of package 14 can remove an item 42 from within container 40 to utilize the removed item 42. For example, where package 14 is a packet of seeds, the bearer of stored-value card assembly 10 removes the packet of seeds 14 from backer 16 and is able to plant or otherwise utilize the seeds contained within package 40 of seed packet 14. In one embodiment, the at least one item 42 is removed or otherwise accessed while package 40 is still secured to backer 16.

At 138, the current bearer of stored-value card 12 redeems stored-value card 12 for goods and/or services from the retail store or website. At 140, the current bearer of stored-value card 12 optionally adds value to stored-value card 12, and more particularly, to the financial account or financial record associated with stored-value card 12, at the retail store or over the Internet. Upon interacting with and/or utilizing the at least one item 42 at 136, redeeming stored-value card 12 at 138, or adding value to stored-value card 12 at 140, the current bearer of stored-value card 12 or stored-value card assembly 10 subsequently can perform any of steps 136, 138, or 140 as desired. In one embodiment, the ability of the current bearer to repeat redeeming stored-value card 12 at 138 is limited by whether the financial account or record associated with stored-value card 12 has any value at the time of attempted redemption.

Although described above as occurring at single retail store or website, in one embodiment, purchasing stored-value card assembly 10 at 132, redeeming stored-value card 12 at 138, and adding value to stored-value card 12 at 140, can each be performed at any one of a number of stores adapted to accept stored-value card 12 or over the Internet. In one example, the number of stores are each a part of a chain or similarly branded stores. In one example, the number of stores includes at least one website and/or at least one conventional brick and mortar store.

Stored-value cards come in many forms, according to embodiments of the invention. The gift card, like other stored-value cards, can be "re-charged" or "reloaded" at the direction of the original consumer, a gift recipient, or a third party. The term "loading on" or "loaded on" herein should be interpreted to include adding to the balance of the financial account or record associated with the stored-value card. The balance associated with the stored-value card declines as the card is used, encouraging repeat visits to the retail store. The stored-value card remains in the user's purse or wallet serving as an advertisement or reminder to re-visit the associated merchant as well as providing the bearer with an additional product or item, such as candy, toys, seeds, collectibles, etc. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 12 optionally is a physical card made of plastic, paper, generally stiff paper, other substrate, or the like. Adding value to stored-value card 12 optionally includes an either fixed amount or an amount that can be chosen by the consumer or other user. In other alternatives, container 40 may be integrally formed with backer 16. Other modifications within the scope of the invention and its various embodiments will be apparent to those of ordinary skill.

What is claimed is:

1. A stored-value card assembly comprising: a stored-value card including an account identifier adapted to link the stored-value card to a financial account or a financial record; a package including a container and at least one good enclosed within the container, the at least one good being a plurality of loose plant seeds; and a backer individually coupled with each of the stored-value card and the package, and wherein the backer extending about the package and the stored-value card when in the closed configuration.

2. The stored-value card assembly of claim 1, wherein the container is a packet.

3. The stored-value card assembly of claim 1, wherein the backer is transitionable between a open configuration and a closed configuration, the backer being substantially planar when in the open configuration.

4. The stored-value card assembly of claim 1, wherein the stored-value card and the package are each adhered to the backer.

5. The stored-value card assembly of claim 1, wherein at least one of the backer, the stored-value card, and the container includes decorative indicia related to at least one of a season, a holiday, and an occasion.

6. The stored-value card assembly of claim 5, wherein the container includes decorative indicia corresponding with the decorative indicia of at least one of the backer and the stored-value card.

7. The stored-value card assembly of claim 1, wherein the backer is configured to support the stored-value card and the package.

8. The stored-value card assembly of claim 1, wherein at least one of the container and the backer includes means for being visually linked to the stored-value card.

9. The stored-value card assembly of claim 1, wherein the backer includes means for substantially enclosing the financial transaction card and the package.

10. A stored-value card assembly comprising:
    a stored-value card including an account identifier adapted to link the stored-value card to a financial account or a financial record;
    a package including a container and at least one good enclosed within the container; and
    a backer coupled with each of the stored-value card and the package;
    wherein the backer defines three panels, and the stored-value card is coupled to one of the three panels and the package is coupled to another one of the thee panels.

11. The stored-value card assembly of claim 10, wherein the three panels include a first panel, a second panel, and a third panel, and further wherein the first panel is sized smaller than the second panel, and the second panel is sized similar to die third panel.

12. The stored-value card assembly of claim 10, wherein the thee panels include a first panel, a second panel, and a third panel, and further wherein when the backer is in a closed position the first panel is substantially hidden from view.

13. The stored-value card assembly of claim 10, wherein when the backer is in a partially unfolded position, the stored-value card is visible and the package is at least partially hidden from view.

14. A method of assembling a gift card assembly, the method comprising:
    releasably coupling a first panel of a carrier with a gift card linked to a financial account or a financial record;
    releasably coupling a second panel of the carrier with a container enclosing at least one good, wherein the gift card, the carrier, the container, and the at least one good collectively define the gift card assembly; and
    wherein the first panel and the second panel are separated by one or more fold lines and the carrier is foldable about at least one of the one or more fold lines between a first position for displaying the gift card assembly to potential consumers and a second position for presenting the gift card assembly to a recipient.

15. The method of claim 14, further comprising:
    folding the carrier to substantially hide the container from viewing by potential consumers, and
    folding the carrier to position the gift card for viewing by potential consumers.

16. The method of claim 14, further comprising:
    coordinating indicia on the carrier with at least one of indicia on the stored-value card and indicia on the container.

17. The method of claim 14, wherein releasably coupling the carrier with the container includes releasably adhering the carrier to the container.

18. The method of claim 14, further including:
    providing the container enclosing the at least one good, wherein the at least one good is a plurality of seeds.

19. A method of providing a stored-value card assembly, the method comprising:
    displaying a stored-value card assembly including a backer defining a first surface, the first surface being coupled with a stored-value card and a package, the stored-value card including an account identifier adapted to link the stored-value card to a financial account or a financial record, and the package including a container enclosing a plurality of loose items; and activating the stored-value card wherein the backer is foldable between an open position and a closed position, such that when the backer is in the closed position, the backer substantially encloses the stored-value card and the package, and when the backer is in the open position, the stored-value card and the package are visible.

20. The method of claim 19, further comprising:

providing a plurality of plant seeds within the container as the at least one item.

21. The method of claim 20, further comprising:

accepting the stored-value card as payment for one or more of goods and services.

* * * * *

UNITED STATES PATENT AND TRADEMARK OFFICE
CERTIFICATE OF CORRECTION

PATENT NO.        : 7,275,683 B2                                                           Page 1 of 1
APPLICATION NO.   : 11/108356
DATED             : October 2, 2007
INVENTOR(S)       : Karie Lazarowicz et al.

It is certified that error appears in the above-identified patent and that said Letters Patent is hereby corrected as shown below:

In Column 10, line 17, delete "thee" and add -- three --.
In Column 10, line 22, delete "die" and add -- the --.
In Column 10, line 24, delete "thee" and add -- three --.

Signed and Sealed this

Twenty-sixth Day of January, 2010

David J. Kappos
*Director of the United States Patent and Trademark Office*